United States Patent
Hoffman

[15] 3,689,811
[45] Sept. 5, 1972

[54] HIGH VOLTAGE CAPACITOR

[72] Inventor: Paul Hoffman, 9244 Balboa Ave., San Diego, Calif. 92123

[22] Filed: Oct. 21, 1971

[21] Appl. No.: 191,159

[52] U.S. Cl..................................317/259, 317/260
[51] Int. Cl. ................................................H01g 1/14
[58] Field of Search.......................317/259, 260, 242

[56] References Cited

UNITED STATES PATENTS 2,531,185  11/1950  Wurster......................317/260

FOREIGN PATENTS OR APPLICATIONS 270,241  6/1927  Great Britain.............317/260

Primary Examiner—E. A. Goldberg
Attorney—William E. Anderson et al.

[57] ABSTRACT

A high energy density, high voltage capacitor. The capacitor comprises a plurality of stacked capacitor winding sections having tab connectors extending completely through the windings and folded back adjacent opposed sides of the windings. The winding sections with the tab connectors are stacked and compressed to series connect the sections. The sections are impregnated with a scavenger-type dielectric fluid and are encapsulated in a solid organopolymeric body.

7 Claims, 3 Drawing Figures

PATENTED SEP 5 1972
3,689,811
FIG. 1
FIG. 2
FIG. 3
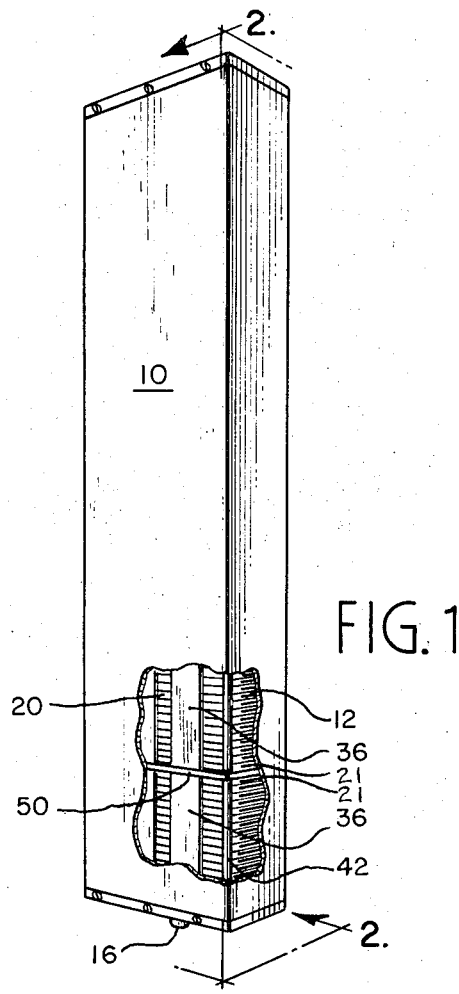
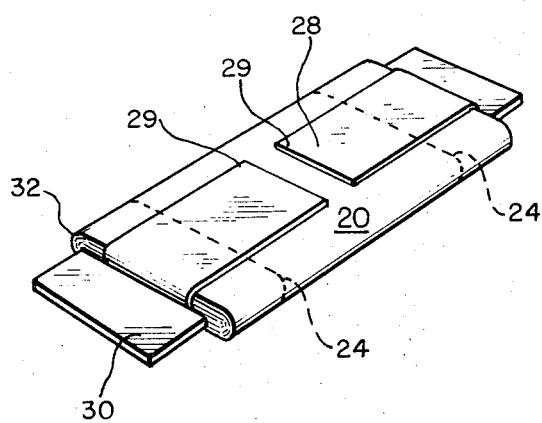
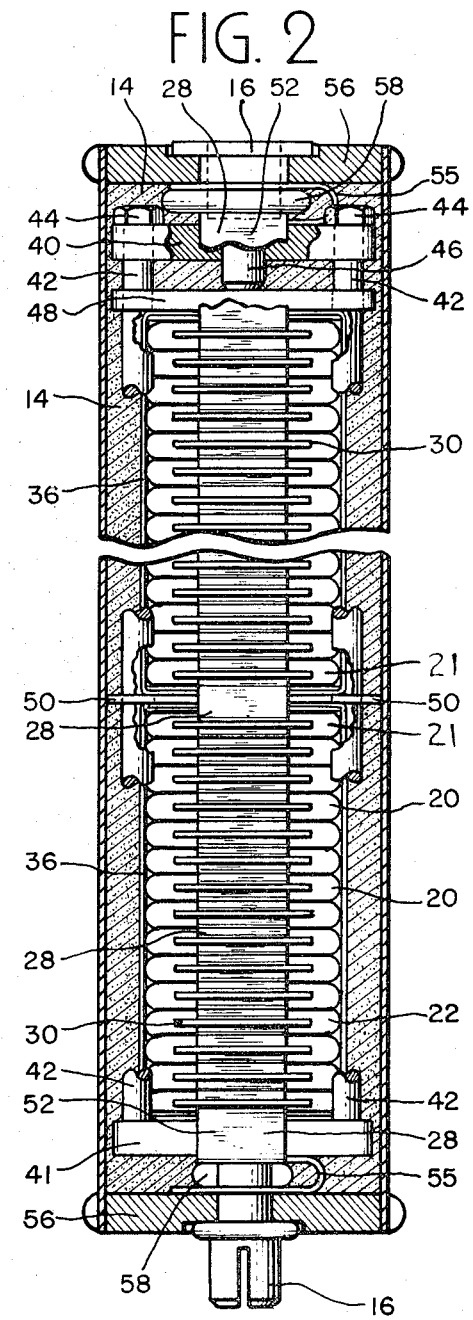

HIGH VOLTAGE CAPACITOR

The present invention is directed to capacitors. More particularly, the present invention is directed to high stress energy storage capacitors which are suitable for use as peaking capacitors in fast discharge pulser systems such as Marx generators.

Capacitors suitable for energy storage under conditions of high electrical stress are an important element of electrical systems involving the accumulation, storage, and pulsed charge and discharge of high voltage electrical energy. Such capacitors are employed, for example, for energy storage in electromagnetic forming equipment, and in Marx generators. It has been increasingly important that capacitors used for high voltage energy storage have a high level of performance properties. As the simultaneous achievement of these performance properties involves somewhat conflicting technical considerations, there have been difficulties in providing capacitors having the combination of performance properties of the levels required for effective utilization of high voltage storage and discharge technology. For example, such energy storage capacitors should have a high charge voltage capability, the ability to withstand a high voltage gradient without breakdown, and a high life expectancy in terms of number of charge and discharge cycles before failure. It is also important that such capacitors have a high energy storage density in terms of energy storage capability per unit weight, and that they be sufficiently economical to permit practical commercial use. In this regard, capacitors having an electrode and dielectric system permitting high energy density and long life is disclosed in copending Application Ser. No. 153,628, filed June 16, 1971 and entitled CAPACITOR AND METHOD FOR MANUFACTURE THEREOF.

High energy density, high voltage gradient, pulse charged peaking capacitors find particular utility in fast discharge pulser systems such as Marx generators, where they serve to decrease the risetime of the output pulse from the Marx generator due to limitations imposed by the inductance of the generator. However, there have been difficulties in providing suitable peaking capacitors for full utilization of Marx generators. Suitable peaking capacitors should not only have an electrode and dielectric system permitting high energy density and long life under the high frequency pulse charge operating conditions prevailing in such Marx generator systems, but should also present a low impedance and low inductance under the high peak current conditions of pulsed charge and discharge, and should have a short-time-period transit time to permit complete and uniform charge and discharge within relatively brief time periods.

Accordingly, it is an object of the present invention to provide an improved peaking capacitor for high voltage, high energy density storage. A further object is the provision of a light-weight peaking capacitor suitable for use with a Marx generator and having a low impedance, a low inductance and a short-time-period transit time.

These and other objects of the invention are more particularly set forth in the following detailed description and in the accompanying drawings of which FIG. 1 is a perspective view, partially broken away, of a capacitor in accordance with an embodiment of the present invention;

FIG. 2 is an enlarged side view, partially broken away, of a portion of the capacitor of FIG. 1 showing the internal construction; and FIG. 3 is a perspective view of a capacitor winding section of the capacitor of FIG. 1.

Generally, the present invention is directed to a high energy density, high voltage, pulse charged capacitor which is particularly adapted for use as a peaking capacitor in fast discharge pulser systems such as Marx generators. The capacitor comprises an electrode and dielectric assembly which is impregnated with a scavenger type dielectric fluid, an organopolymeric body which is compatible with the dielectric fluid encapsulating the assembly, and terminal means for providing external electrical connection with the assembly through the organopolymeric body. The electrode and dielectric assembly comprises metal electrodes separated by an absorbent dielectric material impregnated with a liquid castor oil dielectric fluid.

The electrode and dielectric assembly is made up of a plurality of capacitor winding sections which generally are constructed using thin metal foil electrodes wound with thin, separating, dielectric layers in order to achieve a high ratio of electrode surface area to unit volume. The thin intermediate dielectric layers separating the metal foil electrodes comprise an absorbent material such as capacitor paper which is impregnated with a scavenger-type liquid dielectric such as castor oil. Preferably, the thin intermediate dielectric layers are composite structures comprising alternating layers of capacitor paper and an impermeable plastic such as polypropylene or polyethylene terephthalate (commonly known under the tradename MYLAR). The capacitor winding sections of the electrode and dielectric assembly are connected in series so that the charge voltage characteristic of the finished capacitor is increased. In this connection, the capacitor winding sections have a particular form of tab construction which facilitates series connection and provides additional advantages in a high energy density peaking capacitor. In this regard, each of the capacitor winding sections comprising electrically insulated electrodes wound about an axis, is provided with two tab connectors which extend completely through the capacitor winding section longitudinally of the winding axis to make electrical connection with the respective electrodes of the capacitor winding section. In the electrode and dielectric assembly of the capacitor of the present invention, the two connecting tabs extending through each capacitor winding section are folded back such that they lie adjacent opposed exterior sides of the capacitor section. The capacitor winding sections themselves are in stacked relationship such that the connecting tabs of adjacent capacitor sections make electrical contact, thereby resulting in series connection throughout the stacked capacitor assembly.

The capacitor also includes means for compressing the capacitor sections in the electrodes and dielectric assembly longitudinally of their stacking axis, and there is generally uniform compression throughout the stacked capacitor winding sections of the electrode and dielectric assembly.

The capacitor of the present invention will now be more fully described with respect to the embodiment illustrated in FIGS. 1, 2 and 3 of the drawings.

In FIG. 1, which has been partially broken away to expose internal construction, is illustrated a capacitor 10 which embodies features of the present invention. The capacitor 10 has an electrode and dielectric assembly 12 which is impregnated with castor oil, a scavenger-type fluid dielectric. In FIG. 2 is shown a polyurethane body 14, which is completely compatible with the castor oil impregnant, encapsulates assembly 12 and contains the fluid impregnant. Terminal means 16 provides electrical connection with the electrode and dielectric assembly 12 through the polyurethane body 14.

The electrode and dielectric assembly 12 of the illustrated embodiment comprises a plurality of stacked, series-connected capacitor winding sections 20, which are arranged in a plurality of subassembly units 22. The capacitor winding sections 20 making up the electrode and dielectric assembly 12 of the capacitor 10 are most clearly illustrated in FIG. 3. The stacking and assembly of the winding sections 20 in subassembly units 22, and the stacking and electrical connection of the subassembly units is perhaps best shown in FIG. 2.

The capacitor winding sections 20 of FIGS. 1, 2 and 3 are constructed from two long metal electrodes which in the illustrated embodiment are sheets of aluminum foil having a uniform thickness of between about 0.00013 inch and about 0.002 inch, and preferably about 0.0005 inch. The aluminum foil electrodes are separated by two identical dielectric interlayers which are each a composite dielectric structure made up of alternating layers of absorbent dielectric sheet material and impermeable organopolymeric film. The absorbent dielectric sheet material is capacitor grade kraft paper having a thickness of between about 0.0002 inch and about 0.001 inch, and preferably about 0.0003 inch. The impermeable organopolymeric dielectric film is capacitor grade polyester film, such as a polyethylene terephthalate sold under the tradename MYLAR having a thickness of between about 0.00025 inch and about 0.002 inch, and preferably about 0.0005 inch. The paper and MYLAR sheets are in the form of long strips of equal width and in the illustrated embodiment, three paper strips and two MYLAR strips are alternately arranged with their longitudinal edges parallel and adjacent to form each of the dielectric interlayers which separate the two aluminum foil electrodes. The paper strips thus form the outside surfaces of each of the dielectric interlayers, which accordingly are also in the form of a long strip having a width equal to that of their component paper and MYLAR layers. The two aluminum foil electrodes are also in the form of long strips, and have a width (shown by dotted lines 24) which is narrower than the width of the dielectric interlayers separating the electrodes so that the dielectric interlayers will overlap the edges of the foil in the finished capacitor winding section. The two aluminum foil electrode strips are assembled in alternating, parallel relationship with the two composite dielectric strips so that the longitudinal edges of the dielectric strips extend beyond the longitudinal edges of the aluminum foil electrode strips. Insulating dielectric margins are thereby provided to insure the electrical reliability of the capacitor winding sections. The capacitor winding section 20 is constructed by winding the alternatingly assembled electrode and dielectric strips about a cylindrical axis and then flattened to form a generally rectangular, pad-shaped structure in which the foil electrodes are separated from each other on each side by the dielectric interlayers. As is apparent in the drawings, the rotational axis (not shown) is planar in the flattened winding structure, and successive, multiple layers of the electrodes and the dielectric interlayers accordingly form parallel planar, rectangular layers in the flattened central region of the winding section 20. The dielectric strips are not only wider than the aluminum foil electrodes but are also longer than the electrodes so that the first and final turns (dead turns) of the capacitor winding 20 are made with only the dielectric strips. In this manner, the electrodes are provided with insulating end margins as well as the insulating side margins, and the aluminum foil electrodes are effectively and reliably insulated from each other for high voltage operation. The number of turns of the electrodes wound to provide the individual capacitor winding sections 20 may be varied over a wide range in order to result in a desired capacitance value; however, generally between about 10 and about 40 turns provides an effective and readily stackable capacitor section.

Electrical connection with the metal strip electrodes of the capacitor winding section 20 is provided by two tab connectors 28, one for each electrode. Only one of the tab connectors 28 is shown in FIG. 3, it being understood that the other tab connector 28 is generally identically located at the opposite wide of the capacitor winding section 20. The tab connectors 28 are rectangular metallic sheets, tin coated copper or aluminum, which are best somewhat thicker than the foil electrodes of the winding sections 20. The tab connectors extend completely through the capacitor section 20 longitudinally of the axis of the winding. Each of the tab connectors 28 lies in electrical contact with one of the metal electrodes of the winding section 20 and is insulated from the other electrode of the winding section, and the tab connectors are laid in at the midpoint of the winding of the capacitor sections 20 in order to minimize inductive effects of current flow. It is a particular advantage of this through-tab construction that no cut tab ends are present in the active area of the capacitor winding section, and increased reliability of performance is provided because of the elimination of cut end burrs which might exist in the case of tab connectors which would not extend completely through the capacitor winding section.

The tab connectors 28 of the capacitor winding section 20 are separated by a tab insulator 30 which is made up of one or more sheets of electrically insulating material such as MYLAR. The tab insulator 30 is slightly wider than the tab connectors 28 to provide insulating margins, and is of sufficient length to extend completely through and slightly beyond the marginal ends 32 of the capacitor winding section 20, longitudinally of its winding axis and between the tab connectors 28. The thickness of the insulation sheets of the tab insulator 30 should best be greater than that employed in the dielectric layers of the winding itself. For example, the tab insulator may be made up of two sheets of 0.005 inch thick insulation, inserted through the winding 20 between the tab connectors 28. Because the tab insulator 30 is wider than the tab connector 28 and extends slightly beyond the marginal ends 32 of the winding section 20, the folded-back tab connectors are reliably insulated from each other by the tab insulator, even under conditions of high electrical stress.

The tab connectors are approximately twice as long as the capacitor winding section 20 (measured longitudinally of its axis between the marginal ends 32) and the midpoints of the tab connectors 28 are located approximately at the midpoint of the axis of the capacitor winding section 20. As illustrated in FIGS. 2 and 3, the tab connectors 28 are folded back at the respective marginal ends 32 of the capacitor winding section 20 so that they lie parallel to, and adjacent to opposite flattened exterior sides of the capacitor winding section 20. Because the tab connectors 28 are approximately twice the length of the winding section 20 and are symmetrically positioned through the section 20, when folded back in this manner the ends 29 of each tab connector 28 lie symmetrically adjacent each other at approximately the middle of their respective side of the winding section 20. With the exception of possible lateral displacement with respect to the layers of the winding section as a result of the tab connectors 28 being laid in at the midpoint of the winding, the capacitor winding section 20 is generally bilaterally symmetrical about its flattened, longitudinal winding axis 26, and a perspective view of the other side of the capacitor section of FIG. 3 showing the other tab connector would be generally identical to that of FIG. 3.

Because the tab connectors 28 are in electrical contact with only one electrode of the capacitor section 20, and because these tab connectors are insulated from each other but are exposed at opposite sides of the capacitor section 20, it will be seen that stacking a plurality of these capacitor sections 20 so that the tab connectors of adjacent capacitor sections are in electrical contact will result in series connection of the stack. Furthermore, this series electrical connection may be accomplished merely by pressure contact of the tab connectors of adjacent capacitor winding sections without the necessity for soldering or crimping of tabs. Controlled pressure contact of adjacent capacitor winding sections also aids in the control of dimensional tolerances in the electrode and dielectric assembly 12 of the stacked capacitor winding sections 20. Moreover, with the tab connectors folded back at each margin end 32 of the flattened winding 20, when a stack of adjacently arranged and aligned winding sections 20 is compressed to a preselected dimension, an equalized, uniform pressure is provided throughout the stack, which is advantageous in a high energy density, high stress capacitor, and particularly in such a capacitor which would be subjected to high frequency charge and discharge conditions as in fast discharge pulser systems. A uniformly compressed stack eliminates possible high stress concentrations and premature damage to windings.

As shown in FIGS. 1 and 2, a plurality of capacitor winding sections 20 are stacked in subassembly units 22 and a plurality of the subassembly units 22 are themselves stacked to made up the electrode and dielectric assembly 12 of the capacitor 10. The through-tab capacitor winding sections 20 with the tab connectors 28 folded back adjacent the body of the winding sections from the margin ends 32 of the winding have a uniform cross section which is particularly adapted to provide a physically stable and electrically reliable configuration upon compressional stacking in a direction transverse to the winding plane of the individual capacitor sections. The capacitor winding sections 20 of the subassemblies 22 are stacked in columnar, symmetrically aligned relationship and are compressively held together by tape bands 36 which extend circumferentially around the capacitor winding sections of the subassembly units 22 longitudinally of their stacking axis. In order to prevent distortion of the capacitor winding sections in the compressed subassembly stacks rigid, rectangular leveling sheets, which should be of an electrically insulating material and of approximately the same length and width as the capacitor winding sections 20, are placed at the ends of each subassembly stack between the compressive tape bands 36 and the two end capacitor winding sections 21.

As best shown in FIG. 2, the tab connectors 28 of the capacitor winding sections 20 lie in compressive electrical contact between the capacitor winding sections 20 of the subassembly stacks 22. Because the subassembly stacks 22 are bilaterally symmetrical about their longitudinal stacking axis, with the tab connectors 28 extending from both margin ends 32 of the windings 20 to contact with the adjacent terminal connectors of the adjacent winding sections, it will be seen that a current path is provided down the length of two sides of the stacked subassembly 22. The double current path thus provided effectively reduces by a factor of two the inductance and resistance from this source with respect to current flow through the subassembly stacks 22 as compared with the values which would exist for a single current path.

The subassembly stacks 22 are themselves stacked in columnar, symmetrically aligned relationship between the rectangular electrode and dielectric assembly end plates 40, 41. The end plates 40, 41 are of larger dimensions than the capacitor winding sections 20 and are provided with parallel compression rods 42 extending between each corner of the end plates 40, 41 and the stacked subassemblies 22 are located within the zone defined by the parallel compression rods 42. The connecting rods 42 and end plates 40, 41 are preferably made of a strong, light-weight, electrically insulating material such as glass fiber reinforced epoxy plastic.

The compression rods 42 are under tension between the end plates 40, 41 which consequently results in compressing the stacked subassembly units 22 located between the end plates 40, 41. In this connection, the compression rods 42 are secured at the bottom end plate 41 and are provided with tightening nuts 44 at the upper end plate 40 for adjusting the longitudinal dimension between the end plates 40, 41 to a predetermined value in order to place the subassembly units 22 (and the capacitor winding sections 20 in the subassemblies) under a predetermined, uniform pressure. The compressive force is directly transmitted to the stacked subassemblies 22 by the bottom end plate 41, and indirectly from the upper end plate 40 through screw unit 46 and plate 48 which is slidably mounted on the compression rods 42. In order to prevent buckling of the compressed subassembly units 22 in the electrode and dielectric assembly 12, thin rigid, electrically insulating leveling plates 50 are located between the stacked subassemblies 22. These flat leveling plates 50 are also slidably mounted on the parallel connecting rods 42, and accordingly prevent lateral displacement of the subassembly units 22 of the compressed electrode and dielectric assembly 12, without adversely affecting the relatively even pressure distribution throughout the stacked assembly 12.

As shown in FIG. 2, the subassembly stacks 22 are connected in series by pressure contact of the appropriate end tab connectors 28 between the adjacent end capacitor winding sections 21 of the stacked subassembly units 22. In this regard, the manner of electrical connection between subassembly units 22 is the same as that between the capacitor winding sections 20 that make up the subassembly units. In order to make connection, these end tab connectors 28 extend around the tape bands 36 and the rigid rectangular insulation sheets 38 at the ends of the subassembly units, and meet directly adjacent one side of the slidably mounted levelling insulators 50, between the insulator 50 and tape bands of one of the subassembly units. Accordingly, a double current path is provided through the entire column of the electrode and dielectric assembly 12.

The tab connectors 28 at the ends 52 of the electrode and dielectric assembly 12 are electrically connected with the respective terminals 16 at the ends of the capacitor 10 by means of conducting connectors 55. The terminals 16 extend through the polyurethane body 14 encapsulating the castor oil impregnated assembly 12, and are located at opposite ends of the capacitor 10. The terminals extend through the respective capacitor end plates 56 forming the exterior ends of the capacitor 10, and are secured to the end plates by nuts 58. The end tab connectors of the assembly 12 are soldered or connected in some other suitable manner to the conducting connectors, 55, which in turn are bolted to the terminals 16 by the nuts 58 which secure the terminals to the end plates 56.

The polyurethane body 14 accordingly serves to physically integrate the components of the capacitor 10 and to protect the capacitor structure. Furthermore, the polyurethane body provides additional electrical insulation for the capacitor structure, both with respect to the capacitor as a whole and with respect to the individual internal components of the capacitor. Moreover, the polyurethane body effectively and permanently contains the liquid dielectric castor oil within the dielectric interlayers separating the electrodes of the capacitor winding sections 20, and the amount of liquid dielectric employed in the capacitor is present at a minimum level which is most efficiently utilized.

A thin, fiber glass epoxy case 60 which is secured to the capacitor end plates 56 by screws 62 form a protective barrier at the outside surface of the capacitor 10. In constructing the capacitor of the present invention, the desired number of capacitor winding sections making up the subassembly units of the electrode and dielectric assembly may be aligned and stacked in an assembly jig, with the rectangular levelling sheets being placed under the bottom of the first winding section and over the top of the last winding section. Adjacent tab connectors of adjacent winding sections 20 in the stack are accordingly placed in electrical contact with each other along a double current path extending through the subassembly. The tab connectors at the ends of the subassembly of course are folded back in the jig around the rigid rectangular supporting sheets at the end of the subassembly as well as the tape bands so that they are exposed at the exterior surface of the subassembly units. The assembly jig may then be tightened to a predetermined value, and the tape bands secured to maintain the subassembly in a compressed condition. The finished subassembly may then be removed from the assembly jig. The desired number of subassembly units and the intermediate levelling plates for the complete electrode and dielectric assembly are then stacked and series connected in the zone defined by the compression rods and bottom end plate. The top plates and electrodes are then attached and the assembly is tightened to a predetermined dimension by means of the four nuts at the ends of the compression rods. The assembly may then be inserted in the fiber glass-epoxy case, and subsequently impregnated with castor oil and encapsulated with polyurethane plastic.

The unimpregnated electrode and dielectric assembly is completely dried prior to impregnation with castor oil. Any water present in the finished capacitor is deleterious to its performance and for best results it is necessary to thoroughly dry the electrode assembly.

The drying step is carried out particularly to effect thorough drying of the capacitor paper of the dielectric interlayers in the capacitor winding sections. The drying is best carried out at a temperature of from about $\phi°$ C. to about $\frac{1}{8}°$C. under vacuum. The higher the vacuum under which the unit is dried, the more effective will be the drying operation, and preferably the drying is carried out at an absolute pressure of about 100 microns or less. Purging with a completely dry gas, such as dry nitrogen, may be helpful to facilitate the drying of the capacitor sections of the electrode and dielectric assembly. In order to thoroughly dry the assembly, and particularly the paper dielectric, the assembly is generally maintained under the conditions of heat and vacuum for from about 2 to about 48 hours.

After the electrode and dielectric assembly has been thoroughly dried, the assembly is immersed in castor oil under vacuum so that the stacked capacitor winding sections are covered with the liquid dielectric. This is readily accomplished by introducing the castor oil under vacuum into the upright case through one electrical terminal so that at least the windings of the capacitor sections are covered, and preferably so that the entire case is filled with castor oil. The castor oil should be of a grade, such as grade DB, which is suitable for use as a liquid dielectric and should be completely dry. The stacked capacitor sections of the electrode and dielectric assembly are immersed in the castor oil under vacuum so that the dielectric interlayers of the windings will be thoroughly and completely impregnated with the liquid dielectric. It is important that there be no voids or air-containing regions in the capacitor sections, particularly in the active zone of a capacitor section defined directly between the metal foil electrodes, and in this regard there should be less than 1 percent and preferably less than 0.0001 percent by volume, of air or void space in the impregnated electrode and dielectric assembly.

After the assembly has been immersed in the castor oil, the vacuum is released so that the castor oil is forced throughout the windings of the capacitor sections, thoroughly impregnating the paper dielectric sheets. This may be facilitated by the application of pressures above atmospheric, and additional cycles of the application and release of vacuum may be carried out to insure thorough and complete impregnation, particularly for large, tight windings having numerous turns of electrode and dielectric.

After the electrode and dielectric assembly, including the paper layers of the dielectric interlayers, has been thoroughly impregnated with castor oil, the free, or excess oil is removed. This may be done by pouring off the oil in which the electrode and dielectric assembly has been immersed, and thoroughly draining the excess oil from the assembly. The assembly may be centrifuged (and/or wiped or blotted if impregnation was not carried out in the case) to insure complete removal of excess oil. Excess oil not located in the active zone of the capacitor sections or in the insulating margins of the dielectric interlayers overlapping the electrodes, serves little or no useful purpose and adds unnecessary weight to the finished capacitor. Furthermore, excess oil such as would drain from the electrode and dielectric assembly in the case prior to or during encapsulation with polyurethane, might in fact interfere with the encapsulation. Of course, care should be taken in this step to insure that the castor oil will not be removed from the absorbent dielectric paper to produce voids or air pockets, particularly in the active zones of the capacitor sections. In the windings, there should be continuous solid or liquid dielectric between the electrodes.

After the excess castor oil has been removed, the stacked electrode and dielectric assembly is encapsulated in polyurethane plastic. The case containing the electrode and dielectric assembly should be placed under vacuum, again preferably as high a vacuum as practically possible, such as about 500 microns or less, and more preferably about 200 microns or less.

A polyurethane prepolymer casting mixture is then introduced through one terminal into the upright case containing the electrode assembly, so that the case is filled and the electrode and dielectric assembly is covered with the polyurethane prepolymer.

The case should best be filled slowly, such as over a period of between about 10 min. to about 8 hours, so that the polyurethane prepolymer will be thoroughly degassed. After the case is filled, the vacuum deaeration may be continued for about 2 hours or until the polyurethane prepolymer gels or is completely polymerized.

Polyurethane casting resins which are suitable for use herein are generally well-known and are derived from polyisocyanates such as toluene diisocyanate and methylene bis (phenylisocyanate), and polyhydroxy compounds such as polyesters and polyethers having hydroxyl groups. The polyurethane product is a solid product and should not have any voids or bubbles. Isocyanate-capped prepolymers are conventionally employed as the isocyanate component of polyurethane casting mixtures, and are mixed with a polyhydroxy compound (and a catalyst if desired) and cured to form a polyurethane body. In the present invention it is preferred to use the polyurethane systems such as are used for potting electrical components, which result in a somewhat resilient polyurethane body upon curing.

It should be noted that castor oil is a triglyceride oil which is a polyester having isocyanate-reactive hydroxyl groups, and is a suitable component of polyurethane systems for use in the present invention. The castor oil liquid dielectric is accordingly compatible with the polyurethane resin system, to the advantage of the capacitors of the present invention.

The polyurethane casting system should have a "pot life" sufficiently long to permit the introduction of the casting mixture over a period of time and to permit thorough impregnation of the portions of the capacitor or electrode and dielectric assembly which are not filled with the castor oil dielectric. In general it is desirable in this regard that the polyurethane casting mixture have a gel time of more than about 2 hours in a 1 pound mass at 25°C.

After the casting step, the polyurethane casting mixture is cured, preferably at room temperature, but an elevated temperature of up to about 160°F. may be used. The finished capacitor is removed from the autoclave after curing.

The following example describes a specific capacitor of the present invention.

EXAMPLE

Seventy capacitor winding sections of the type illustrated in FIG. 3 are wound. The two electrodes of the capacitor sections are 0.0005 inch thick strips which are 1.50 inches wide. The dielectrics are 3.00 inches wide and are made up of alternating layers of 0.00025 inch capacitor kraft paper and 0.00075 inch thick MYLAR polyester film which is free of surface contaminants. There are three layers of paper and two layers of polyester film in the dielectric strips, and the 3.00 inch width of the strips provides for an overlap of the electrode of 0.75 inch at each margin edge of the winding. The winding of the capacitor sections is started with one "dead turn" of the two dielectric strips, and the through-tab construction is used with 0.63 inch wide × 0.003 inch thick × 6.00 inch long aluminum or tinned copper tabs laid in at the midpoint of the winding. The tabs are separated by two pieces of 1.25 inch wide × 0.005 inch thick × 4.00 inch long composite insulators. The electrodes themselves are 42.00 inches long and result in about 15 turns of winding on each capacitor section.

The windings are wrapped under a moderate tension and are snug and wrinkle-free. The windings are finished off with one complete "dead turn" plus one-quarter inch of the two dielectrics without the electrode. The finished capacitor winding sections are about 0.20 inch thick (measured perpendicular to the winding plane, about 1.50 inches wide (measured parallel to the margin edges of the winding), and are 3.00 inches long (the length of the winding equalling the width of the dielectric strips).

The 70 windings are stacked in five subassembly units of 14 windings each. The 14 windings of each subassembly unit are aligned and stacked in an assembly jig with the tab connectors of adjacent windings folded back at the margin ends and in pressure contact between the windings. Rigid rectangular plates 1.50 inches wide, 0.032 inch thick and 3.00 inches long are placed at the ends of each subassembly stack (with the end tab connectors of the stack free, the stack is tightened in the jig to a longitudinal dimension of between 3.00 and 3.10 inches, and the compressed stack is secured by tape bands which are 0.005 inch thick and 1.00 inch wide. The compression provides for the maintenance of good electrical contact between the adjacent tab connectors and minimizes the buildup of stack height in the finished capacitor. The five subassemblies are then stacked and connected between the end plate and compression rods as shown in FIGS. 1 and 2, with intermediate levelling plates which are 0.032 inch thick. The five stacked subassembly units are then tightened down to a predetermined dimension of between 15.00 and 15.50 inches between the outer surfaces of the end winding sections of the stack, the end tab connectors soldered to the connector, and the end plate, terminals and case assembled. The assembled unit is placed in a vacuum chamber at a temperature of 97°±3°C. and an absolute pressure of less than 100 microns for 48 hours in order to thoroughly dry it. DB grade castor oil is then introduced into the case at a temperature of 65°C. to cover the unit and the vacuum is released to thoroughly impregnate the capacitor paper of the dielectric windings. The excess oil is drained and centrifuged off, leaving about 18 ounces of castor oil impregnated in the electrode and dielectric assembly. The impregnated electrode and dielectric assembly is again placed in a vacuum chamber at a vacuum of about 200 microns and at a temperature of about 30°C. An unpigmented polyurethane casting resin is prepared by thoroughly mixing 54 percent by weight of an isocyanate prepolymer (Vorite prepolymer No. 128 sold by Baker Castor Oil Company) with 46 percent by weight of DB grade castor oil. This system has a gel time in a one pound unit of 20 hours at 25°C. The casting resin is slowly introduced into the vacuumized case over a period of 2 hours and encapsulates the electrode assembly. The cured polyurethane body provides a leak-proof seal for the capacitor sections, is resilient, and moisture-proof, and results in a capacitor having fully impregnated capacitor sections with a minimum volume of dielectric fluid. There is less than about 1 percent, by volume, air or void space in the windings or in the polyurethane body. The cured polyurethane encapsulated capacitor weights about 7 pounds, 17.5 inches high, 4 inches wide, 2 inches thick and has a capacitance of 625 pF. It has a life expectancy of more than 20,000 discharges, and a charge voltage capability of about 500 kv. When operated at a charge voltage of 500 kVDC, the energy content is 78 joules, or an energy density of 11.2 joules/pound.

The capacitor is ideally suited for use in Marx generator pulser systems and is capable of handling shock, vibration, and physical stresses associated with voltage charge and discharge operations without leaks or structural failure. The capacitor has low impedance, and the double current path through the stack helps provide the capacitor with the low E S L of 0.3 $\mu$H. The capacitor is designed for a peak current operation at 10,000 amperes, but can withstand peak current values well beyond the rated value.

As will be apparent to those skilled in the art, various modifications, adaptations and variations of the foregoing specific disclosure can be made without departing from the teachings of the invention.

Various of the features of the invention are set forth in the following claims.

What is claimed is:

1. A high energy density, high voltage capacitor comprising, in combination,
    an electrode and dielectric assembly which is impregnated with a scavenger type dielectric fluid, said assembly comprising a plurality of stacked capacitor winding sections having tab connectors extending completely through said sections longitudinally of their respective winding axes and folded back adjacent opposed respective exterior sides of said winding sections, said capacitor winding sections being stacked such that adjacent tab connectors of adjacent stacked capacitor winding sections are in electrical contact between said adjacent winding sections to thereby result in series connection of the stacked capacitor winding sections,
    a solid organopolymeric body encapsulating said assembly and which is compatible with said dielectric fluid,
    terminal means for providing external electrical connection with said assembly through said organopolymeric body, and
    means for compressing said stacked capacitor winding sections longitudinally of their stacking axis.

2. A capacitor in accordance with claim 1 wherein said dielectric fluid is castor oil and wherein said organopolymeric body is polyurethane plastic.

3. A capacitor in accordance with claim 2 wherein said capacitor winding sections are generally rectangular, flattened windings comprising two thin aluminum electrode strips wound with two insulating dielectric interlayers separating said electrode strips which are wider and longer than said electrode strips to provide insulating margins about said strips.

4. A capacitor in accordance with claim 3 wherein said tab connectors are elongated metal sheets which are laid in at the midpoints of said electrode strips of said winding sections to minimize inductive effects of current flow, and wherein said elongated sheets are folded back at both margin ends of said capacitor winding sections to provide said electrode and dielectric assembly with a double current path through said stacked, series connected capacitor winding sections.

5. A capacitor in accordance with claim 4 wherein said means for compressing said stacked sections includes a plurality of compression rods longitudinally about said assembly and end plates in connection with said rods and adjacent the ends of said assembly, said rods being under tension such that a compressive force is exerted upon said assembly through said end plates.

6. A capacitor in accordance with claim 5 wherein said capacitor winding sections are stacked in a plurality of subassembly units each comprising a plurality of said capacitor winding sections, and wherein levelling plates slidably mounted on said compression rods are located between said subassembly units to maintain alignment of said stacked, compressed capacitor winding sections in said subassembly units.

7. A capacitor in accordance with claim 6 wherein there is less than about 1 percent by volume of air or void space in said impregnated electrode and dielectric assembly.

* * * * *

UNITED STATES PATENT OFFICE
CERTIFICATE OF CORRECTION

Patent No. 3,689,811　　　　　　　　Dated September 5, 1972

Inventor(s) PAUL HOFFMAN

It is certified that error appears in the above-identified patent and that said Letters Patent are hereby corrected as shown below:

Cover page, after item [72] Inventor, insert item

[73) Assignee: Maxwell Laboratories, Inc.

San Diego, California.

Column 8, lines 30-31, instead of "about 0°C. to about

1/8°C.", read "about 100°C. to about 150°C.".

Signed and sealed this 17th day of April 1973.

(SEAL)
Attest:

EDWARD M. FLETCHER, JR.　　　　　　　　ROBERT GOTTSCHALK
Attesting Officer　　　　　　　　　　　Commissioner of Patents